(12) United States Patent
Deng et al.

(10) Patent No.: US 9,965,240 B2
(45) Date of Patent: May 8, 2018

(54) STORAGE METHOD OF OLED DISPLAY PANEL COMPENSATION DATA

(71) Applicant: Shenzhen China Star Optoelectronics Technology Co., Ltd., Shenzhen (CN)

(72) Inventors: Yufan Deng, Shenzhen (CN); Mingjong Jou, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 176 days.

(21) Appl. No.: 15/114,836

(22) PCT Filed: Apr. 27, 2016

(86) PCT No.: PCT/CN2016/080326
§ 371 (c)(1),
(2) Date: Jul. 27, 2016

(87) PCT Pub. No.: WO2017/161631
PCT Pub. Date: Sep. 28, 2017

(65) Prior Publication Data
US 2018/0088885 A1    Mar. 29, 2018

(30) Foreign Application Priority Data

Mar. 25, 2016  (CN) .......................... 2016 1 0177670

(51) Int. Cl.
*G09G 3/00*         (2006.01)
*G06F 3/147*        (2006.01)
(Continued)

(52) U.S. Cl.
CPC ........... *G06F 3/147* (2013.01); *G09G 3/2092* (2013.01); *G09G 3/3266* (2013.01); *G09G 2320/0276* (2013.01)

(58) Field of Classification Search
CPC ...... G09G 3/30; G09G 3/2092; G09G 3/3233; G09G 2300/043; G09G 2320/0242; G09G 2320/0693
See application file for complete search history.

(56) References Cited

U.S. PATENT DOCUMENTS

2006/0261841 A1* 11/2006 Fish ..................... G09G 3/006
                                                      345/212
2008/0106501 A1*  5/2008 Cok ........................ G09G 3/30
                                                       345/76
(Continued)

*Primary Examiner* — Kevin M Nguyen
(74) *Attorney, Agent, or Firm* — Leong C. Lei

(57) ABSTRACT

The present invention provides a storage method of OLED display panel compensation data. First, the OLED display panel is divided into a plurality of display zones, and then the compensation table and the link table are established. The compensation table records compensation information of the pixels which need to be compensated and zone row addresses and zone column addresses of the pixels. The link table records the zone codes of respective display zones and start digit addresses in the compensation table corresponded with the respective display zones. With the cooperation of the compensation table and the link table to store the OLED display panel compensation data, the storage space occupied by the OLED display panel compensation data can be decreased to lower the production cost of the OLED display panel and to raise the production efficiency of the OLED display panel.

14 Claims, 4 Drawing Sheets

(51) Int. Cl.
*G09G 3/20* (2006.01)
*G09G 3/3266* (2016.01)

(56) References Cited

U.S. PATENT DOCUMENTS

| 2014/0111567 A1* | 4/2014 | Nathan | G09G 3/3233 |
| | | | 345/694 |
| 2015/0042697 A1* | 2/2015 | Park | G09G 3/2092 |
| | | | 345/690 |
| 2015/0187259 A1* | 7/2015 | Jeong | G09G 3/3233 |
| | | | 345/690 |

* cited by examiner

| pixel address | compensation information |
|---|---|
| 01, 01 | 3A7847 |
| 05, 03 | 258A5B |
| ... | ... |
| F0, D2 | E7FEFA |
| ... | ... |
| 09, 01 | 3664D8 |
| A2, 01 | 23C578 |
| ... | ... |
| F0, D8 | 4C5A66 | first display zone: rows 01,01 through F0,D2

M× Nth display zone: rows 09,01 through F0,D8

Fig. 2

| zone code | start digital address address |
|---|---|
| 1 | 00000000 |
| 2 | 000005FA |
| ... | ... |
| M×N | 00E43CCE |

Fig. 3

STORAGE METHOD OF OLED DISPLAY PANEL COMPENSATION DATA

FIELD OF THE INVENTION

The present invention relates to a display technology field, and more particularly to a storage method of OLED display panel compensation data.

BACKGROUND OF THE INVENTION

The flat panel display elements possess many merits of thin frame, power saving, no radiation, etc. and have been widely used. The present flat panel display elements at present mainly comprise the Liquid Crystal Display (LCD) and the Organic Light Emitting Display (OLED).

An OLED possesses many outstanding properties of self-illumination, no requirement of backlight, high contrast, ultra-thin, wide view angle, fast response, and applicability of flexible panel, wide range of working temperature, simpler structure and process. The OLED is considered as next generation flat panel display technology.

An OLED display generally comprises a substrate, an anode located on the substrate, an organic emitting layer located on the anodes, an electron transport layer located on the organic emitting layer, and a cathode located on the electron transport layer. As working, the Hole and the Electron from the cathode are injected to the organic emitting layer, these electrons and the holes are combined to generate excited electron-hole pairs, and the excited electron-hole pairs are converted from the excited state to the ground state for achieving illumination.

In the present production procedure of the flat panel display, the Mura (uneven brightness) often happens due to the reasons, such as the production processes, and a bright spot or a dark spot appears to lead to the display quality descend of the panel. For eliminating the Mura of the OLED display, the compensation table is generally employed to store the compensation information of the respective pixels in the OLED display in prior art. As showing images, the driver board looks up in the compensation table and adjusts the signals to raise the signal of the overdark zone of the panel and to lower the signal of the overbright zone for showing the uniform display result. In the compensation table, each pixel corresponds to one set of compensation information. Each set of compensation information comprises one or more compensation data. The physic meaning of the compensation data is determined according to the algorithm, which is the adjust value or the local gamma value of the specific gray scale in general. Alternatively, it is set to be the voltage value to be adjusted in some algorithm.

In prior art, the size of the compensation table is equal to the pixel amount plus the size of each set of the compensation information. However, not all the pixels in the OLED display need to be compensated. There are also a great amount of pixels which need no compensation. In the aforesaid storage method, the pixels which need no compensation also occupy the storage space. The storage space occupied by the compensation table is pixel column number*pixel row number*compensation information size*color amount. As an illustration, a 4K2K OLED panel needs to be compensated (the pixel column number is 3840, and the pixel row number is 2160), and supposing that size of each set of compensation information is 24 bit, and the color amount is three, the red, the green and the blue. Then, the storage space occupied by the compensation table is 2160*3840*24 bit*3:=597 Mb. The compensation table occupies a large system storage space, and consumes plenty of time for transmission and record of the data in the production line, which reduces the operation speed and the production efficiency of the OLED display panel.

SUMMARY OF THE INVENTION

An objective of the present invention is to provide a storage method of OLED display panel compensation data, which can reduce the storage space occupied by the OLED display panel compensation data to decrease the production cost of the OLED display panel and raise the production efficiency of the OLED display panel.

For realizing the aforesaid objective, the present invention provides a storage method of OLED display panel compensation data, comprising steps of:

step 1, providing an OLED display panel, and the OLED display panel is divided into a plurality of display zones which are aligned in array, and each display zone corresponds to one zone code;

each display zone comprises a plurality of pixels aligned in array, and each pixel corresponds to a zone row address and a zone column address in the display zone;

step 2, establishing a compensation table, and the compensation table records compensation information of the pixels which need to be compensated and zone row addresses and zone column addresses of the pixels;

the compensation table sequentially stores according to an order of zone codes from the pixels in the first display zone to the pixels in the last display zone;

step 3, establishing a link table, and the link table records the zone codes of respective display zones and start digit addresses in the compensation table corresponded with the respective display zones;

step 4, storing the compensation table and the link table to accomplish the storage of the compensation table of the OLED display panel.

All the zone code, the zone row address, the zone column address, the compensation information and the start digit address are indicated with hexadecimal number.

The zone row address is a row number of the pixel in the display zone where the pixel is, and the zone column address is a column number of the pixel in the display zone where the pixel is.

Data of each line in the compensation table corresponds to one pixel which needs to be compensated.

The start digital addresses corresponded with the respective display zones are row numbers of the data in the compensation table, in which the data is corresponded with the first pixel which needs to be compensated in the display zone.

A storage space occupied by the compensation table is: an amount of pixels which need to be compensated×(zone row address bit number+zone column address bit number+compensation information bit number)×a color amount of the OLED display panel;

a storage space occupied by the link table is: a zone amount×(zone code bit number+start bit address bit number)×a color amount of the OLED display panel.

The OLED display panel is a 4K2K display panel, comprising pixels of 2160 rows, 3840 columns which are aligned in array, and a color amount of the OLED display panel is 3, which respectively are red, green and blue;

in the step 1, the OLED display panel is divided into display zones of 10 rows, 16 columns which are aligned in array, and each display zone comprises pixels of 216 rows, 240 columns;

the zone row address bit number is 8 bit, and the zone column address bit number is 8 bit, and the compensation information bit number is 24 bit, and the zone code bit number is 8 bit, and the start digital address bit number is 32 bit.

An amount of the pixels which need to be compensated in the OLED display panel in the step 2 is smaller than or equal to 60% of an amount of total pixels.

The present invention further provides a storage method of OLED display panel compensation data, comprising steps of:

step 1, providing an OLED display panel, and the OLED display panel is divided into a plurality of display zones which are aligned in array, and each display zone corresponds to one zone code;

each display zone comprises a plurality of pixels aligned in array, and each pixel corresponds to a zone row address and a zone column address in the display zone;

step 2, establishing a compensation table, and the compensation table records compensation information of the pixels which need to be compensated and zone row addresses and zone column addresses of the pixels;

the compensation table sequentially stores according to an order of zone codes from the pixels in the first display zone to the pixels in the last display zone;

step 3, establishing a link table, and the link table records the zone codes of respective display zones and start digit addresses in the compensation table corresponded with the respective display zones;

step 4, storing the compensation table and the link table to accomplish the storage of the compensation table of the OLED display panel;

wherein all the zone code, the zone row address, the zone column address, the compensation information and the start digit address are indicated with hexadecimal number;

wherein the zone row address is a row number of the pixel in the display zone where the pixel is, and the zone column address is a column number of the pixel in the display zone where the pixel is.

The benefits of the present invention are: the present invention provides a storage method of OLED display panel compensation data. First, the OLED display panel is divided into a plurality of display zones, and then the compensation table and the link table are established. The compensation table records compensation information of the pixels which need to be compensated and zone row addresses and zone column addresses of the pixels. The link table records the zone codes of respective display zones and start digit addresses in the compensation table corresponded with the respective display zones. With the cooperation of the compensation table and the link table to store the OLED display panel compensation data, the storage space occupied by the OLED display panel compensation data can be decreased to lower the production cost of the OLED display panel and to raise the production efficiency of the OLED display panel.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings,

FIG. 2 is a diagram of step 2 of a storage method of OLED display panel compensation data according to the present invention;

FIG. 3 is a diagram of step 3 of a storage method of OLED display panel compensation data according to the present invention;

DETAILED DESCRIPTION OF PREFERRED EMBODIMENTS

For better explaining the technical solution and the effect of the present invention, the present invention will be further described in detail with the accompanying drawings and the specific embodiments.

Figure 1:
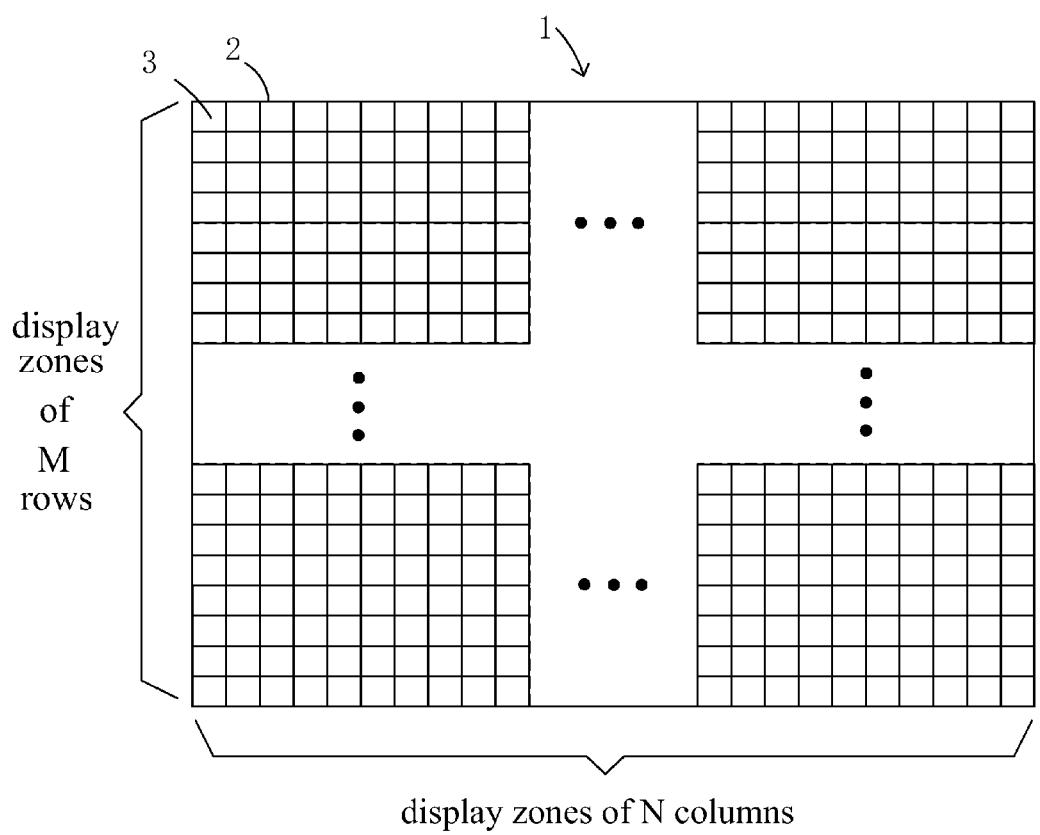
FIG. 1 is a diagram of step 1 of a storage method of OLED display panel compensation data according to the present invention.
Figure 4:
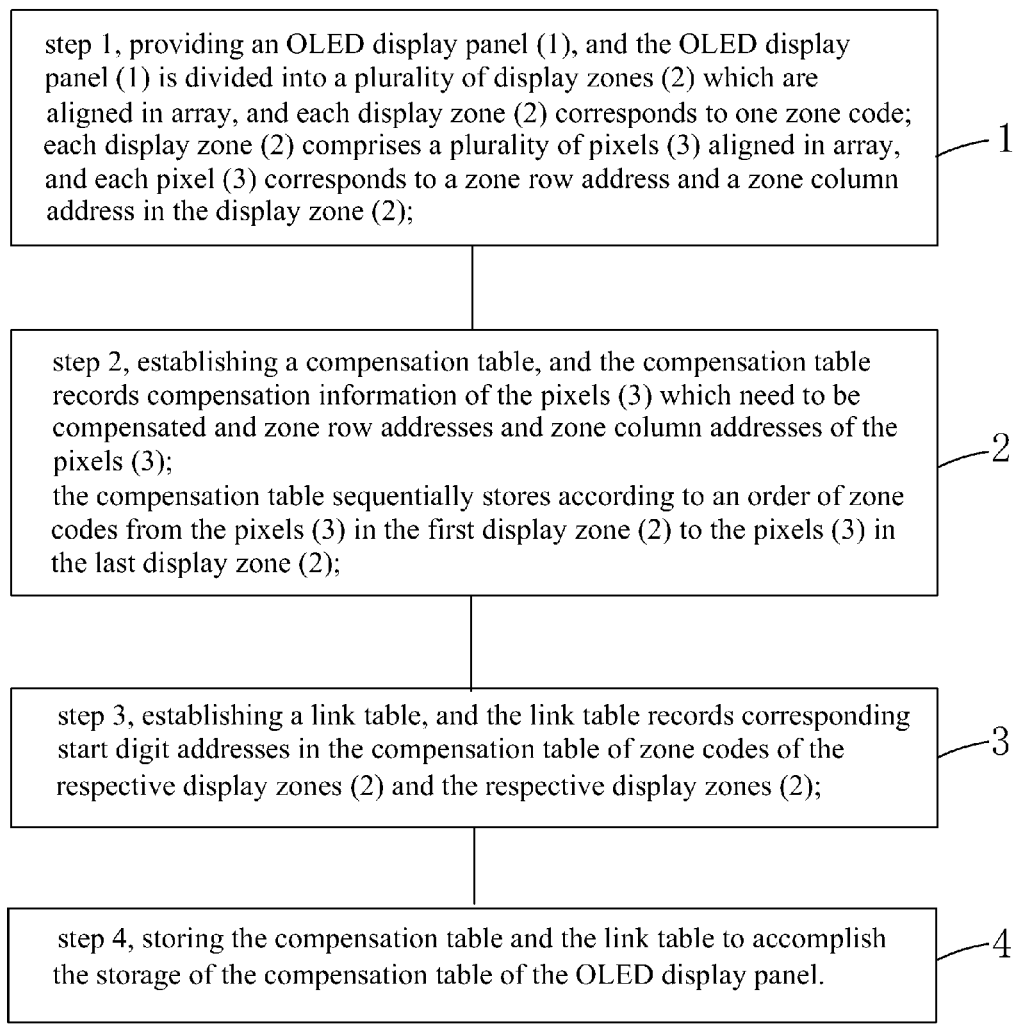
FIG. 4 is a flowchart of a storage method of OLED display panel compensation data according to the present invention.

Please refer to FIG. 4. The present invention further provides a storage method of OLED display panel compensation data, comprising steps of:

step 1, referring to FIG. 1, providing an OLED display panel 1, and the OLED display panel 1 is divided into a plurality of display zones 2 which are aligned in array, and each display zone 2 corresponds to one zone code;

each display zone 2 comprises a plurality of pixels 3 aligned in array, and each pixel 3 corresponds to a zone row address and a zone column address in the display zone 2.

Specifically, as shown in FIG. 1, M and N are set to be positive integers, and the OLED display panel 1 is equally divided into M×N display zones of M row, N columns, and the zone codes respectively are 1–M×N;

the zone row address is a row number of the pixel 3 in the display zone 2 where the pixel is, and the zone column address is a column number of the pixel 3 in the display zone 2 where the pixel is.

step 2, referring to FIG. 2, establishing a compensation table, and the compensation table records compensation information of the pixels 3 which need to be compensated and zone row addresses and zone column addresses of the pixels 3;

the compensation table sequentially stores according to an order of zone codes from the pixels 3 in the first display zone 2 to the pixels 3 in the last display zone 2.

As shown in FIG. 2, the compensation table comprises data of two columns, and both the data of two columns are indicated with hexadecimal number, and the data of the first row is the pixel address of the pixel 3 which needs to be compensated, wherein the first number is the zone row address, and the second number is the zone column address. For instance, 05 in the second row, the first column is the zone row address, and 03 is the zone column address; the data of second row is the compensation information (such as 3A7847, 258A5B) of the pixel 3 which needs to be compensated;

Furthermore, data of each line in the compensation table corresponds to one pixel 3 which needs to be compensated, and the compensation table sequentially stores according to an order of zone codes 1–M×N from the pixels 3 in the first display zone 2 to the pixels 3 in the M×Nth display zone 2. Namely, after all the pixels 3 which need to be compensated in the first display zone 2 are stored one by one, the pixels 3 which need to be compensated in the second display zone 2 start to be stored, and after all the pixels 3 which need to be compensated in the second display zone 2 are stored one by one, the pixels 3 which need to be compensated in the third display zone 2 start to be stored, and so on until it is accomplished that all the pixels 3 which need to be compensated in the M×Nth display zone 2 are stored one by one.

For instance, the pixel of first row, first column in the eighth display zone does not need to be compensated, the compensation table will not record the information of the pixel; the pixel of 210th row, 16th column needs to be compensated, and the compensation information is (36, 25, 18), and the zone row address is 210, and the zone column address is 16, which is indicated by (D2, 10) with hexadecimal number and occupies 16 bit storage space in total, and the compensation information of the pixel is indicated by (24, 19, 12) with hexadecimal number, which occupies 24 bit storage space in total, and the record of the pixel is: (D2, 10, 241912), which occupies 40 bit storage space in total.

step 3, referring to FIG. 3, establishing a link table, and the link table records the zone codes of respective display zones and start digit addresses in the compensation table corresponded with the respective display zones.

Particularly, both the zone codes and the start digit addresses are indicated with hexadecimal number.

Specifically, the start digital addresses corresponded with the respective display zones 2 are row numbers of the data in the compensation table, in which the data is corresponded with the pixel 3 which needs to be compensated in the display zone 2.

For instance, the data corresponded with the first pixel 3 which needs to be compensated in the eighth display zone is at the 1036th line of the compensation table, the compensation information of the eighth display zone starts from the 1036th line of the compensation table, and 8 bit is employed to record the zone code, and 32 bit is employed to record the start address, and what the link table records is (08, 0000040C), which occupies 40 bit storage space.

step 4, storing the compensation table and the link table to accomplish the storage of the compensation table of the OLED display panel.

Specifically, a storage space occupied by the compensation table is: an amount of pixels which need to be compensated×(zone row address bit number+zone column address bit number+compensation information bit number)×a color amount of the OLED display panel; a storage space occupied by the link table is: a zone amount×(zone code bit number+start bit address bit number)×a color amount of the OLED display panel, and for instance, in one preferred embodiment of the present invention, the OLED display panel 1 is a 4K2K display panel, comprising pixels of 2160 rows, 3840 columns which are aligned in array, and in the step 1, the OLED display panel 1 is divided into display zones 2 of 10 rows, 16 columns which are aligned in array, and each display zone 2 comprises pixels of 216 rows, 240 columns, and the zone row address bit number is 8 bit, and the zone column address bit number is 8 bit, and the compensation information bit number is 24 bit, and the zone code bit number is 8 bit, and the start digital address bit number is 32 bit. Namely, the storage space occupied by the compensation table in this preferred embodiment is 3840× 2160×(8+8+24)×3×R=995R MB, wherein R is the ratio of the amount of the pixels which needs to be compensated in the amount of total pixels, and the storage space occupied by the link table is 160×(8+32)×3=19.2 Kb=0.01875 MB, and as the amount of the pixels which need to be compensated is 60% of an amount of total pixels, the total storage space occupied by the compensation data is 597.01875 MB, and as the amount of the pixels which need to be compensated is 50% of an amount of total pixels, the total storage space occupied by the compensation data is 497.51875 MB, and as the amount of the pixels which need to be compensated is 40% of an amount of total pixels, the total storage space occupied by the compensation data is 398.01875 MB, and as the amount of the pixels which need to be compensated is 30% of an amount of total pixels, the total storage space occupied by the compensation data is 298.51875 MB. It can be found that in comparison with the storage space occupied by the compensation data which is about 597 Mb in prior art, in this embodiment, as the amount of the pixels which need to be compensated in the OLED display panel 1 in this embodiment is smaller than or equal to 60% of the amount of total pixels, the storage space occupied by the compensation data of the OLED display panel can be effectively decreased with the aforesaid storage method to consequently lower the requirement to the hardware system, and thus to reduce the production cost of the OLED display panel, and meanwhile to decrease the required time of transmission and record of the data for promoting the production efficiency of the OLED display panel.

In conclusion, the present invention provides a storage method of OLED display panel compensation data. First, the OLED display panel is divided into a plurality of display zones, and then the compensation table and the link table are established. The compensation table records compensation information of the pixels which need to be compensated and zone row addresses and zone column addresses of the pixels. The link table records the zone codes of respective display zones and start digit addresses in the compensation table corresponded with the respective display zones. With the cooperation of the compensation table and the link table to store the OLED display panel compensation data, the storage space occupied by the OLED display panel compensation data can be decreased to lower the production cost of the OLED display panel and to raise the production efficiency of the OLED display panel.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A storage method of OLED display panel compensation data, comprising steps of:
    step 1, providing an OLED display panel, and the OLED display panel is divided into a plurality of display zones which are aligned in array, and each display zone corresponds to one zone code;
    each display zone comprises a plurality of pixels aligned in array, and each pixel corresponds to a zone row address and a zone column address in the display zone;
    step 2, establishing a compensation table, and the compensation table records compensation information of the pixels which need to be compensated and zone row addresses and zone column addresses of the pixels;
    the compensation table sequentially stores according to an order of zone codes from the pixels in the first display zone to the pixels in the last display zone;
    step 3, establishing a link table, and the link table records the zone codes of respective display zones and start digit addresses in the compensation table corresponded with the respective display zones;
    step 4, storing the compensation table and the link table to accomplish the storage of the compensation table of the OLED display panel.

2. The storage method of OLED display panel compensation data according to claim 1, wherein all the zone code, the zone row address, the zone column address, the compensation information and the start digit address are indicated with hexadecimal number.

3. The storage method of OLED display panel compensation data according to claim 2, wherein the zone row address is a row number of the pixel in the display zone where the pixel is, and the zone column address is a column number of the pixel in the display zone where the pixel is.

4. The storage method of OLED display panel compensation data according to claim 2, wherein data of each line in the compensation table corresponds to one pixel which needs to be compensated.

5. The storage method of OLED display panel compensation data according to claim 4, wherein the start digital addresses corresponded with the respective display zones are row numbers of the data in the compensation table, in which the data is corresponded with the first pixel which needs to be compensated in the display zone.

6. The storage method of OLED display panel compensation data according to claim 2, wherein a storage space occupied by the compensation table is: an amount of pixels which need to be compensated×(zone row address bit number+zone column address bit number+compensation information bit number)×a color amount of the OLED display panel;
   a storage space occupied by the link table is: a zone amount×(zone code bit number+start bit address bit number)×a color amount of the OLED display panel.

7. The storage method of OLED display panel compensation data according to claim 6, wherein the OLED display panel is a 4K2K display panel, comprising pixels of 2160 rows, 3840 columns which are aligned in array, and a color amount of the OLED display panel is 3, which respectively are red, green and blue;
   in the step 1, the OLED display panel is divided into display zones of 10 rows, 16 columns which are aligned in array, and each display zone comprises pixels of 216 rows, 240 columns;
   the zone row address bit number is 8 bit, and the zone column address bit number is 8 bit, and the compensation information bit number is 24 bit, and the zone code bit number is 8 bit, and the start digital address bit number is 32 bit.

8. The storage method of OLED display panel compensation data according to claim 7, wherein an amount of the pixels which need to be compensated in the OLED display panel in the step 2 is smaller than or equal to 60% of an amount of total pixels.

9. A storage method of OLED display panel compensation data, comprising steps of:
   step 1, providing an OLED display panel, and the OLED display panel is divided into a plurality of display zones which are aligned in array, and each display zone corresponds to one zone code;
   each display zone comprises a plurality of pixels aligned in array, and each pixel corresponds to a zone row address and a zone column address in the display zone;
   step 2, establishing a compensation table, and the compensation table records compensation information of the pixels which need to be compensated and zone row addresses and zone column addresses of the pixels; the compensation table sequentially stores according to an order of zone codes from the pixels in the first display zone to the pixels in the last display zone;
   step 3, establishing a link table, and the link table records the zone codes of respective display zones and start digit addresses in the compensation table corresponded with the respective display zones;
   step 4, storing the compensation table and the link table to accomplish the storage of the compensation table of the OLED display panel;
   wherein all the zone code, the zone row address, the zone column address, the compensation information and the start digit address are indicated with hexadecimal number;
   wherein the zone row address is a row number of the pixel in the display zone where the pixel is, and the zone column address is a column number of the pixel in the display zone where the pixel is.

10. The storage method of OLED display panel compensation data according to claim 9, wherein data of each line in the compensation table corresponds to one pixel which needs to be compensated.

11. The storage method of OLED display panel compensation data according to claim 10, wherein the start digital addresses corresponded with the respective display zones are row numbers of the data in the compensation table, in which the data is corresponded with the first pixel which needs to be compensated in the display zone.

12. The storage method of OLED display panel compensation data according to claim 9, wherein a storage space occupied by the compensation table is: an amount of pixels which need to be compensated×(zone row address bit number+zone column address bit number+compensation information bit number)×a color amount of the OLED display panel;
   a storage space occupied by the link table is: a zone amount×(zone code bit number+start bit address bit number)×a color amount of the OLED display panel.

13. The storage method of OLED display panel compensation data according to claim 12, wherein the OLED display panel is a 4K2K display panel, comprising pixels of 2160 rows, 3840 columns which are aligned in array, and a color amount of the OLED display panel is 3, which respectively are red, green and blue;
   in the step 1, the OLED display panel is divided into display zones of 10 rows, 16 columns which are aligned in array, and each display zone comprises pixels of 216 rows, 240 columns;
   the zone row address bit number is 8 bit, and the zone column address bit number is 8 bit, and the compensation information bit number is 24 bit, and the zone code bit number is 8 bit, and the start digital address bit number is 32 bit.

14. The storage method of OLED display panel compensation data according to claim 13, wherein an amount of the pixels which need to be compensated in the OLED display panel in the step 2 is smaller than or equal to 60% of an amount of total pixels.

* * * * *